June 30, 1959     T. S. SKILLMAN     2,892,896
SIGNALLING ARRANGEMENTS Filed June 6, 1956     8 Sheets-Sheet 1

Inventor
Thomas S. Skillman
BY
Ward, Neal, Haselton, Orme & McElhannon
Attorneys

SIGNALLING ARRANGEMENTS

Thomas S. Skillman, Cremorne, New South Wales, Australia, assignor to T. S. Skillman and Company Pty. Limited, Cammeray, near Sydney, Australia, a company of New South Wales Application June 6, 1956, Serial No. 589,695

Claims priority, application Australia June 8, 1955

11 Claims. (Cl. 179—84)

The invention relates to signalling systems for telephone lines.

The object of the invention is to provide an improved method of signalling whereby all the advantages of continuous signals can be obtained while still transmitting signals over the voice frequency path. When the problem of obtaining full signalling facilities over lines with amplifiers or modulators in their path was first stated, it was felt that it was of vital importance that the signal currents should travel the same path as speech. This enabled the signalling equipment to be located away from the transmission equipment, generally in the switching office to which it naturally belonged and enabled patching of the voice circuit at intermediate points to be carried out without any complications from the maintenance aspect, such as were necessary when signalling traversed a separate path.

Consequently signalling was generally effected by pulses of voice frequency current. Different frequencies or different combinations of frequencies or different time durations were used to distinguish between the different signals.

The use of such pulse systems demanded very large groups of relays, often as much as 40 or 50 relays. These were partly necessary to provide the means of generating and measuring the pulses but largely to safeguard against various switching conditions which could result in the loss of the pulses, or their mutual interference. It was necessary to safeguard against an operator pulling out and plugging in again too quickly or against the release signal in the forward direction being masked by a supervisory signal in the backward direction if the called subscriber hung up just as the outgoing operator pulled out. When signalling had to be carried out over two or more lines switched in tandem with automatic connections at the intermediate switching points as well as at the terminal the precautions necessary to avoid either the loss of signals or the false creation of a new call on one of the sections became very complicated and the switching sequence in some cases was so involved that an appreciable amount of line time was lost waiting for a connection to clear down (sometimes as much as 10 seconds, which is a long time for an operator to wait who has seized the line to start a new call). Also, of course, the relay groups grew in size and cost.

A considerable simplification was introduced on carrier circuits only when the pulses instead of being transmitted at a frequency in the voice range were transmitted at zero frequency—i.e. by the carrier itself. This avoided trouble due to false operation by voice, thus simplifying the receiver, and avoided any carryover of pulses from one section of a tandem call to another. The relay groups required for such circuits were considerably simpler.

A further simplification took place when developments were carried out to enable the carrier current to be sent continuously, so that the signals were defined by a transition from one steady state to another (carrier on to carrier off for example). This gave relay groups no bigger than those required for D.C. circuits.

As as measure of the simplification to relay groups involved one may say that the average voice frequency pulse sysem required 50 relays at each end, the carrier frequency pulse system required 15–20 relays and the steady state carrier system required 2–5 relays.

There remains, however, a steady demand for signalling methods which do not depend on the use of the carrier current, firstly because the continuous transmission of the carrier demands slightly closer repeater spacing and secondly because of the fact that many circuits already in existence cannot be adapted; there is also, of course, a steady proportion of voice frequency circuits still being installed and obviously no carrier is available.

Accordingly a system of steady state signalling by currents which travel over the speech path was introduced. A small section, generally near the top, of the speech band was reserved for the signals and filters were used to separate the continuous signalling currents from the speech path. The same small relay groups (2–5 relays) were used, but such a system has the disadvantage that the frequency band available for speech is diminished.

The idea was then introduced of so arranging the steady state signals that they were not present on the line during speech, but only during the idle conditions. With this system the fact that the signals leak over from one part of the tandem path to another does not matter, as the release signal, being continuous, overrides all the others and cannot be lost—only delayed. The relay groups can thus be much the same as for the other systems with steady state currents. This system, however, has the disadvantage that the signals in the backward direction do not necessarily come in at the beginning and end of conversation. For example, the normal use of the backward signalling path is to retain current On until the called subscriber replies; changed to current Off during conversation between the subscribers, and put current On again when the called subscriber hangs up. Conversation is, however, needed sometimes before the called subscriber replies and in this case the signalling tone in the backward direction is On. This has been overcome in the past either by tolerating it or by providing filters which eliminate this tone and thus slightly degrade the conversation by narrowing the frequency band that is passed. These filters are switched out when the called subscriber replies. As conversations prior to the reply of the called subscriber are between operators and do not have to cater for the attenuation of extensions to subscribers this is a reasonably satisfactory solution.

The signal receivers, however, have to fulfill two functions which are partly contradictory to each other. While the switching into circuit of the elimination filters has to be carried out immediately the signal frequency is transmitted over the line to avoid any disturbances in further connected circuits, a certain time delay is required for the translation of the signal frequency into a corresponding D.C. signal to prevent spurious frequencies from giving false signals during conversation. A solution to this is to arrange for the signal receiver to operate in two steps; then spurious frequencies although not giving any wrong signal will temporarily switch the band elimination filter into the line during conversation. This filter arrangement together with a blocking amplifier is also essential for tandem working to prevent the continuously transmitted signal frequency in the backward direction from leaking over the two-wire termination into the forward path and thus blocking the receiver of the forward direction.

In addition to the band elimination filters blocking amplifiers in series with these filters were also essential whenever the 4-wire transmission path is terminated by a hybrid transformer connecting it with a two-wire line. During the idle periods signal tone is sent continuously over the 4-wire path in both directions and this signal tone could leak from the sending (forward) path over the hybrid into the receiving (backward) path thus blocking the receiver connected to the receive transmission path. Although it would be possible to disconnect the signal transmitter from the hybrid transformer at the outgoing end in the forward direction of signalling until the tone is removed from the transmission path in making a call, this latter remedy cannot be used on the incoming end as the signal tone remains on the line until the called subscriber replies, but in the meantime the two-wire line has to be connected to the 4-wire transmission path to permit operators' conversation prior to the subscriber's reply. Thus there is no possibility of stopping a leakage from the signal transmitter at the incoming end over the hybrid connection into the signal receiver at that end unless a blocking amplifier between the receiver and the hybrid transformer blocks any tone or noises from reaching the receiver over the hybrid transformer. Operators' conversation will be carried out with the band elimination filters still in circuit, as the tone in the backward direction is still on and, as mentioned above, a slightly degraded conversation has to be accepted.

The blocking amplifier is also necessary whenever tandem connections are made. In such tandem connections in which two 4-wire tranmission paths are connected over two-wire connections with each other as well as with the subscribers the blocking amplifier not only fulfils the function of preventing leakage from the signal transmitter over the hybrid transformer into the signal receiver at the same end as outlined above, but, for example, the signal tone transmitted backwards from the second 4-wire path before the called subscriber replies would without blocking amplifiers leak over the junction between the two paths into the incoming receiver of the first path and would thus prevent a release of this receiver from the outgoing end of this first 4-wire path. Thus no call could be made and the whole system would be blocked completely. The blocking amplifiers arranged between the signal receivers and the 4-wire termination sets as mentioned before prevent such a tie-up of the signal receivers, as they block any signal frequency from entering a transmission path in the wrong direction.

Figure 8:
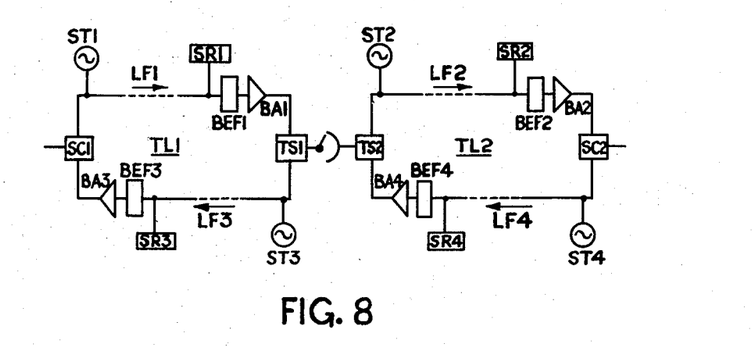
Fig. 8 shows schematically a tandem connection incorporating a known signalling system.

A tandem connection including the known arrangement of band elimination filters and blocking amplifiers is shown schematically in Fig. 8. Two 4-wire lines TL1 and TL2 are shown connected over the termination sets TS1 and TS2 with each other. The line TL1 is further connected to the calling subscriber termination SC1 while the line TL2 is connected to the called subscriber termination SC2. Each line has a forward path (LF1, LF2) and a backward path (LF3, LF4) respectively equipped with signal transmitters ST1 to ST4, signal receivers SR1 to SR4, band elimination filters BEF1 to BEF4, and blocking amplifiers BA1 to BA4. As can be seen from Fig. 8 the band elimination filters are essential to prevent the signal tone from passing the signal receiver and leaking over the hybrid termination into the path of the other direction thus reaching the signal receiver connected thereto. Without such filters signal tone for example from the transmitter ST4 of path LF4 would pass over the termination set TS2 into the forward path LF2 and could block the receiver SR2 in this path. Similarly the signal tone could reach the receiver SR1 in path LF1 over terminations TS2 and TS1 (provided no blocking amplifiers were inserted in the paths).

The necessity for blocking amplifiers as outlined above can also be seen clearly from Fig. 8. Signal tone, for example from the signal transmitter ST4 in path LF4 could leak over the subscriber termination SC2 into the forward path LF2 and operate the receiver SR2 in this path if not blocked by the corresponding blocking amplifier BA2; and furthermore, the signal tone, which is on the line until the called subscriber replies, could pass from the path LF4 over the termination sets TS2 and TS1 into the forward path LF1 thus operating the receiver SR1 connected to this path if not blocked by the corresponding blocking amplifier BA1.

Other solutions have been proposed by changing the frequency of the continuous tone and it is clear that there are a number of fairly obvious ways of retaining the continuous signalling conditions which have now been recognized as so desirable.

The present invention covers a somewhat different approach to the problem by taking advantage of two facts which have perhaps not previously been fully recognized. These are:

(a) There is no danger either on a single line or on a tandem call of the reply supervisory signal (when the called subscriber replies) being lost due to interference with other signals. The only signal which can be originated during this waiting period is a release signal and if a release signal has to be transmitted the loss of the reply supervisory signal is clearly immaterial.

(b) The loss of the "hang up" supervisory signal (when the called subscriber hangs up) is of very little significance. The only damage occurs if the supervisory signal from the local subscriber fails at the same time. In fact many telephone line groups have been operated for years relying upon the supervisory signal from the calling party to tell the operator to release. Let us suppose the "hang up" supervisory signal were lost in one percent of the cases. Let us suppose that in one percent of the cases the supervision of the calling party fails. This means that in 0.01 percent of cases the line may be left unprofitably used for a minute or two until the operator discovers what has happened. Therefore, if we can find some way of making a substantial saving in the amount of equipment required, the small loss of line time in the 0.01 percent of calls can clearly be economically justified.

The new invention takes advantage of the above facts to achieve a considerable simplification in circuits without surrendering the advantages of continuous conditions. Its essential feature is the use of continuous current conditions of the kind described in the forward direction for the calling and clearing signals, combined with the use of pulse signals in the backward direction to provide supervisory signals.

The new arrangement eliminates any double function of the signal receiver as it makes band elimination filters or frequency changing devices unnecessary owing to the fact that there is no signal frequency on the line in the backward direction of transmission except for the short period of the sub-replies pulse and the backward clear pulse. The new arrangement eliminates also blocking amplifiers and can be used in tandem circuits without the danger of signalling in one circuit interfering with the signalling receiver in the other circuit. Thus a substantial saving in equipment can be achieved without sacrificing the advantages of steady state signalling for the essential signals.

The principle of continuous current signalling conditions in the forward direction and pulse signals in the backward direction is applicable to voice frequency lines as well as carrier lines and in the latter case whether a signal frequency at the edge of the channel frequencies or the carrier itself is used for signalling.

In relation to voice frequency lines the new signalling system avoids the disadvantages as outlined above that a signal frequency is on the line in the backward direction while, for example, operator's conversation has to take place. By using signal pulses of comparatively short duration all the difficulties of the known systems which had to be overcome by the use of elimination filters and blocking amplifiers disappear and thus the system will be much simpler in structure as well as maintenance while still maintaining the basic advantages of steady state signalling for all essential signals.

As mentioned above so-called channel edge signalling has been proposed in which the signal frequency is positioned at the edge of the voice frequency band used for speech transmission. The method is applicable to carrier telephone systems in which each channel includes the signal frequency, for example at the upper end thereof.

This signalling method is, for example, described generally in a paper: "An Analysis of the Problems of Long-Line Telephone Signalling" by T. S. Skillman; I.E.E. 1947. The voice channel and the corresponding signalling channel are formed by a high-pass and a low-pass filter combination with a crossover region at about 2800 c./s. and connected to a channel which can pass, for example, 3400 c./s., the high pass filter providing the signalling channel and the low pass filter the voice channel.

The telephone channel available inside the average carrier telephone terminal often has a wider frequency range than the range actually used by speech, as the wider range has to be cut down by a low pass filter used to eliminate tones such as that carried by carrier leak from a neighbouring channel. In such cases, therefore, in which channel edge signalling is combined with carrier equipment, it was an obvious step to use this wider channel, and thus avoid any reduction of the speech band. In this latter case the low pass filter of the above-mentioned filter combination can be eliminated and the low pass filter in the carrier equipment takes over. Very often the high pass filter can be replaced by a tuned circuit. Thus one arrives at a channel edge system using a tuned receiver inserted in the carrier equipment and working, for example at 3,800 c./s. when the final pass range of the voice channel is only 3400 c./s.

Unfortunately, the low pass filter in most carrier systems does not provide sufficient attenuation for the continuous tone used for signalling to prevent interference in the voice path. The attenuation of the low pass filter is chiefly determined by the carrier leak, which is generally 20 db or more below the signal level used for the channel edge signal. For this reason a second low pass filter has to be added or combined with that normally provided to increase the attenuation of the channel edge signal leaking into the voice path.

Although in the forward direction this additional low pass filter or the extra attenuation can be avoided by switching the signal tone "on" in the idle periods and by switching it "off" to transmit the call signal, this principle cannot be applied successfully to the backward direction of transmission in which operator's conversation may take place prior to the transmission of the supervisory signal. The additional attenuation would, therefore, still be required in the backward direction to avoid interference. This latter disadvantage, however, is overcome by the above outlined invention using pulse signals of the channel edge frequency in the backward direction of transmission for the supervisory and clear signals. There is then no signal frequency transmitted over the channel in either direction while any kind of conversation is in progress.

As mentioned above the invention can be applied also to advantage in carrier systems in which the carrier itself is used for signal transmission. In such systems signals are transmitted by the raising and lowering in level of a carrier frequency transmitted over the transmission path. Signalling arrangements of this kind are known in which the carrier is transmitted for signalling purposes only at such a level that it is insufficient for the demodulation of speech. As the steady-state signalling method was used in these known arrangements the carrier frequency was switched on during the whole time of the conversation and therefore the level had to be low enough to prevent undue interference between channels and also to reduce the loading on the various amplifiers in the circuit. On the other hand the carrier level had to be high enough to operate safely the signal receiver. This latter requirement limits the lower level of the carrier which can be used for signalling, as the sensitivity of the receiver cannot be increased above a certain value to maintain its immunity against noise and other disturbances on the line.

Although these known arrangements may be satisfactory where only a few channels are used and manual switchboards require only simple signals, difficulties arise when automatic switching over a great number of channels is required, for example over co-axial cables. The low-level carrier when pulsed to transmit dial pulses will give distortions at the signal receiver, which can lead to difficulties particularly in tandem working, and in addition the continuously transmitted carrier in both directions of transmission during the use of a channel will create a rather heavy load on the common amplifiers in a multi-channel carrier telephone system.

Both of these difficulties are overcome according to the invention by increasing the level of the signalling carrier during the dialling period and by using pulse signalling for signals in the backward direction. As the time used for dialling is only a fraction of the conversation time of a channel the increase in carrier level during the dialling period does not increase appreciably the overall load of the common amplifiers. As, on the other hand, the use of carrier pulses in the backward direction instead of a steady carrier current reduces the load by nearly 50% a very substantial overall reduction in the load of the amplifiers is achieved without sacrificing the most important feature of steady state signalling in the forward direction of transmission, even when a high level carrier is also used for the backward pulse signalling. Steady state signalling in the forward direction is important as it prevents the system getting out of step, but in the backward direction of transmission pulse signalling is quite sufficient as even if some disturbance in the pulse signalling occurs only the one call can be disturbed, and later calls would fall into step again. In a simple form the supervisory signals (called subscriber replies and called subscriber hangs up) can be given in the same form, the distinction being the sequence of the two signals which must follow each other for any established connection. It is, however, possible also to use carrier pulses of different lengths to distinguish the two supervisory signals by themselves irrespective of their sequence.

While it was assumed in the foregoing description that the carrier frequency in the forward direction was switched on for a calling signal and switched off at the end of the conversation the opposite procedure could be followed by which a low level carrier would be on the line in idle periods and would be removed during conversation. For dialling purposes, however, the carrier level would be raised as described above. This raising of the carrier level and subsequent lowering of the carrier level can, for example, be carried out by switching to the higher level at the start of the first dial pulse and maintain it by time delay means at the higher level during each impulse series, or to switch it off depending on a particular "end of selection" signal as used in some installations, or by the signal indicating the reply of the called subscriber.

As only short pulses are transmitted in the backward direction of transmission the highest carrier level can be used also for the pulses used for the supervisory signals without unduly overloading the amplifiers as mentioned above.

The use of high level signalling current for the signal pulses in the backward direction is not only advantageous for carrier signalling but also for voice-frequency signalling and "channel edge" signalling referred to above as in each case a rather sensitive receiver can be used for the backward direction, and thus an additional safeguard against voice operation is provided.

The invention will appear more clearly from the following detailed description of several embodiments in connection with the drawings in which.

Figure 4:
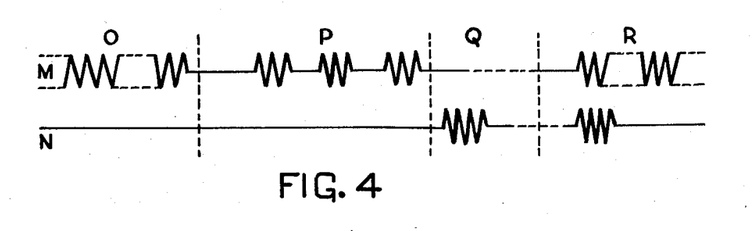
Fig. 4 gives the signalling schedule in the forward and backward direction of transmission respectively.

In the first embodiment of the invention described hereinafter it is assumed that the schedule of signals to be transmitted over a corresponding communication channel should be as shown in Fig. 4. The communication channel itself can be a voice frequency or carrier frequency channel as the signals are transmitted by alternating current. In the forward direction of transmission (curve M in Fig. 4) a signal current of frequency $f1$ is transmitted over the channel during the idle periods of the channel as shown under O, while no signal current is transmitted in the backward direction (curve N in Fig. 4). If a call signal is to be sent the calling terminal interrupts the signal current and thereafter transmits dial pulses by corresponding bursts of signal current as shown under P. The supervisory signal in the backward direction indicating that the called subscriber has answered is given subsequently by a pulse of a frequency $f2$ as shown under Q. At the end of the conversation during which no signal frequencies are transmitted in the forward or backward direction of transmission, a clear-forward signal is given by re-transmitting the signal frequency $f1$ which is maintained until the next call is made, and the clear-backward signal is transmitted by a pulse of a frequency $f3$ as shown under R in Fig. 4. All these signals are sent out following the direct current steady state signals of a connected telephone system and the received alternating current signals are translated again into direct current signals for further transmission.

The difficulties with regard to leakages from one path into another which were discussed above in connection with Fig. 8 depicting a known arrangement are not present when the signalling schedule acocrding to the invention is used. No band elimination filters or blocking amplifiers are needed as the signal tone is only transmitted in the forward direction during the idle period and in this case the transmission path can be disconnected from the hybrid termination. In the backward direction where a conection is required between the transmission path and the termination to transmit operators' conversation no signal frequency is transmitted to line and thus there is no need for a blocking amplifier following the signal receiver of the incoming end. This amplifier can also be dispensed with for tandem connections as can be seen readily from Fig. 8. As there is no signal tone on the line for any length of time in the backward direction from path LF4 (Fig. 8) over the terminating sets TS2 and TS1 and the frequency used for signalling in the backward direction is generally different from the frequency used in the forward direction there is no danger of any operation of the signal receiver SR1 connected to the path LF1 although no band elimination filters BEF and blocking amplifiers BA are provided.

Figure 1:
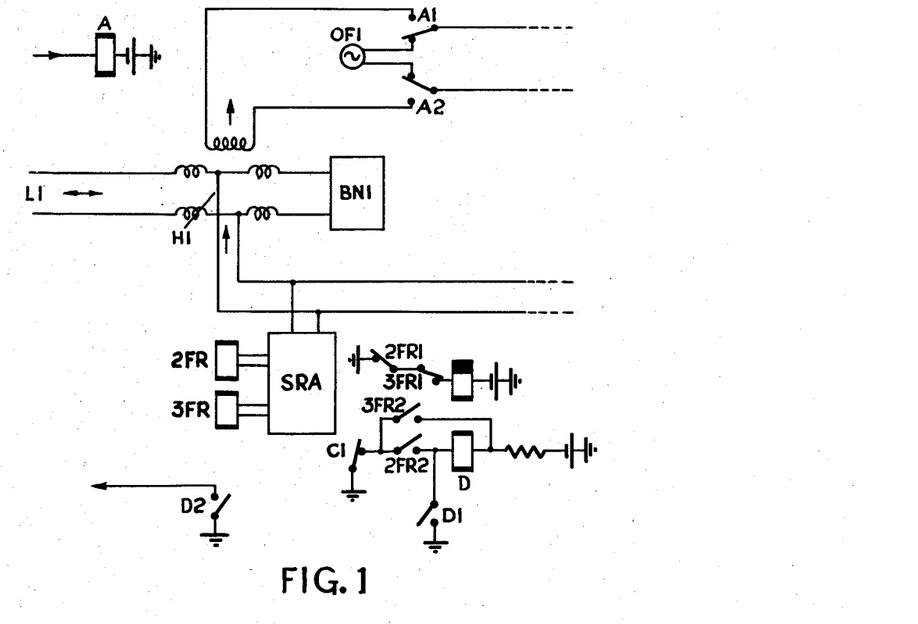
Figs. 1 and 2 show schematically two signal terminals according to the invention.
Figure 2:
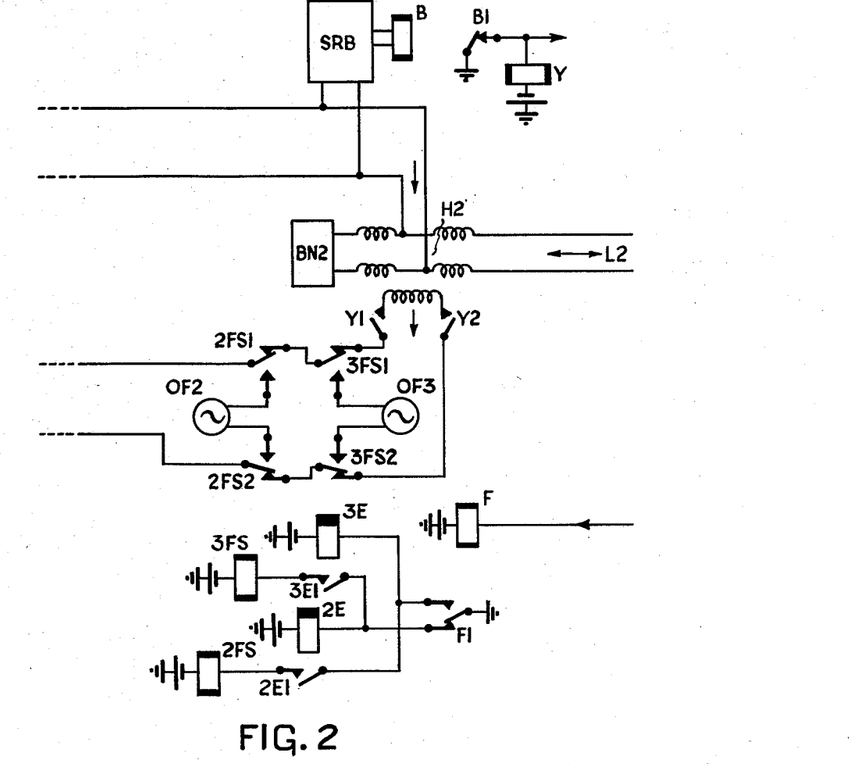

Details of the circuits for a signalling system according to the invention are given hereinafter. Figs. 1 and 2 show the outgoing and incoming respectively of a telephone channel with corresponding signal terminal. In the idle period of the channel signal current of frequency $f1$ will be sent from oscillator OF1 over the relay contacts A1 and A2 and the channel to the signal receiver SRB (Fig. 2) connected with the channel at the incoming end. This receiver, details of which will be described later, operates, for example, a relay B which keeps its contact B1 open during this idle period. Thus the slow-release relay Y is de-energised and contacts Y1 and Y2 are open so to disconnect the hybrid transformer H2 from the return path of the transmission channel to prevent any signal current from leaking over the hybrid H2 into the return path. No signal current, however, is sent over the channel in this direction. Instead of relay Y with contacts Y1 and Y2 a proper termination of line L2 during idle periods can prevent such a leakage.

When a call is made the relay A (Fig. 1) is energised in well known manner, for example, from an automatic exchange and disconnects at contacts A1 and A2 the oscillator OF1 from the channel so that relay B (Fig. 2) releases and closes contact B1 thus sending a signal in known manner to a further automatic exchange and operating relay Y closing contacts Y1 and Y2. Dial pulses are then transmitted, as mentioned above, by short bursts of signal current produced by the pulsing of relay A by the dial. Thus relay B (Fig. 2) connected with the receiver SRB will repeat the pulses and send direct current pulses over contact B1 to the next exchange. After dialling has been completed the supervisory signal will be given by the operation of relay F (Fig. 2) either by applying earth to one side of the relay or by a change in polarity over the line in cases where the relay is connected over a rectifier with the line. This operation of relay F has to be translated into a pulse of signal current of frequency $f2$ for transmission over the communication channel. This is achieved by the relay combination 2E, 2FS for the supervisory signal and the combination 3E, 3FS for the backward-clear signal. In the normal position the slow-release relay 2E is operated over contact F1 and closes its contact 2E1. When relay F operates after the called subscriber has answered as mentioned above the relay 2FS will operate over operated contact F1 and operated contact 2E1 and will connect the oscillator OF2 over contacts 2FS1 and 2FS2 with the communication channel to send a signal frequency $f2$ to the outgoing end. Shortly thereafter the relay 2E will release, as its circuit is interrupted at contact F1, and the transmission of the signal frequency $f2$ stops again.

On the outgoing end (Fig. 1) the signal pulse of frequency $f2$ is received by a suitable receiver SRA which operates the relay 2FR. This relay interrupts at contact 2FR1 the circuit of a normally operated slow-release relay C1 (which has a release delay slightly shorter than the delay of relay 2E (Fig. 2)), which in turn operates the slow-release relay D over released contact C1 and operated contact 2FR2. Relay D operates closing its locking contact D1. Shortly thereafter relay 2FR releases again thus operating again relay C. Relay D remains operated over its contact D1. The supervisory signal pulse is now translated into a direct current signal by the closing of contact D2 which remains closed until the backward clear signal is received.

Conversation is now carried out in the usual manner on a four-wire basis from line L1 over hybrid transformer H1 (balanced by network BN1), operated contacts A1, A2, the communication channel (which can be a voice-frequency or carrier link), hybrid transformer H2 (Fig. 2) which is balanced by network BN2, to line L2. In the opposite direction speech passes over the contacts 3FS1, 3FS2, and 2FS1, 2FS2 to the outgoing end.

At the end of the conversation the clear signal in the forward direction initiated by a release of relay A is transmitted by applying the frequency $f1$ of oscillator OF1 over contacts A1 and A2 to the channel. This signal frequency operates again the receiver SRB (Fig. 2) at the incoming end and thus relay B, which removes at contact B1 earth from the lead to the associated exchange and releases relay Y which in turn opens its contacts Y1 and Y2.

In the backward direction the clear signal is initiated by a release of relay F. During the operation of relay F the slow-release relay 3E was operated to close its contact 3E1. At the release of relay F for transmission of the backward clear signal a circuit is closed for relay 3FS over contact 3E1 and released contact F1. Relay 3FS sends a pulse of signal frequency $f3$ from oscillator OF3 over contact 3FS1 and 3FS2 to the outgoing end. Shortly thereafter the slow-release relay 3E releases again as its circuit had been broken at contact F1, while relay 2E is energized again in readiness for the next call.

At the outgoing end (Fig. 1) the signal pulse of frequency $f3$ operates over signal receiver SRA the relay 3FR which breaks again the circuit for relay C this time at contact 3FR1. At the same time operated contact 3FR2 prepares a short circuit for relay D. As soon as relay C releases this short circuit is completed over contact C1 and relay D releases opening its contacts D1 and D2 thus giving the clear signal into the associated exchange. When at the end of the pulse relay C operates again the relay arrangement is again ready for the next call.

The signal receivers SRA and SRB can be of any conventional design. For example, a receiver using the principle of rectified reaction as shown in Australian patent specification 7828/32 with one and two stages respectively can be used for this purpose.

Figure 3:
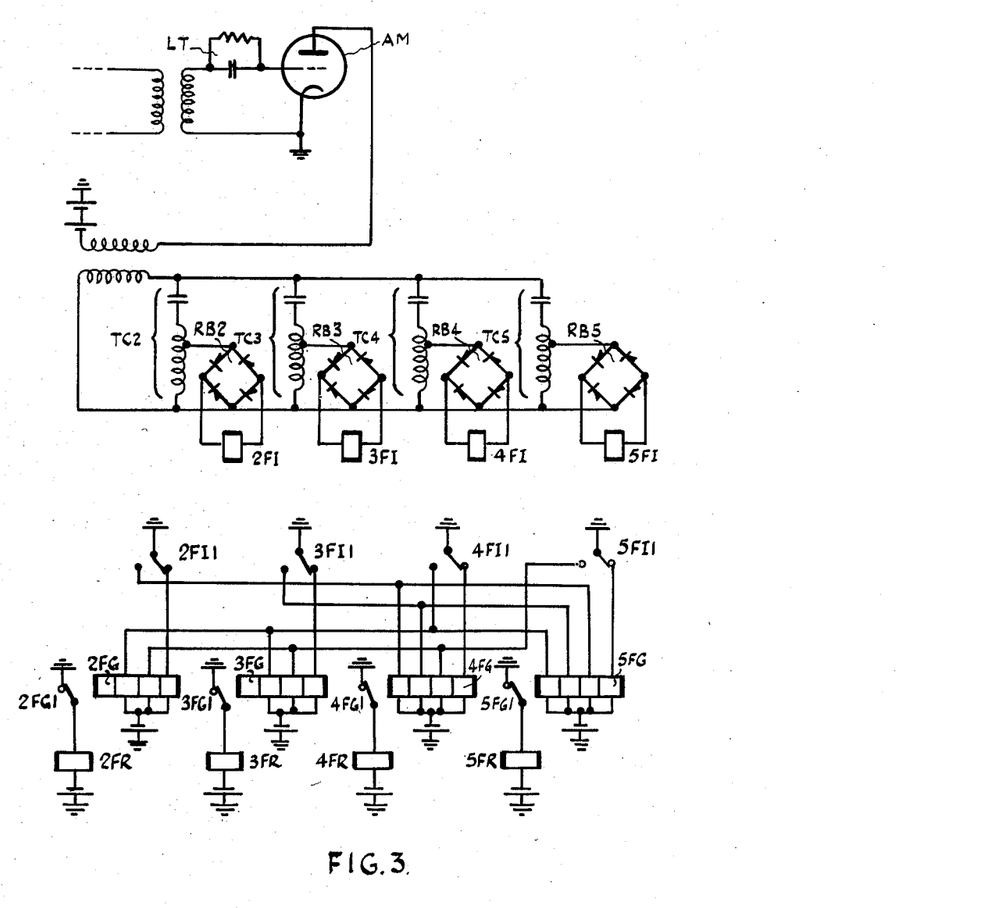
Fig. 3 shows a modification of the signal receiver shown in Fig. 1.

In cases in which a greater immunity against false operation is required a signal receiver as shown in Fig. 3 can be used. This receiver is shown as a four-frequency receiver so that, if necessary, additional signals with different frequencies can be received.

The receiver consists of an amplifier AM, which operates over tuned circuits TC2 to TC5 and the rectifier bridges RB2 to RB5 the relays 2FI to 5FI respectively in accordance with the frequency received at each instance. In the input circuit of the amplifier AM a limiter circuit LT is provided in known manner to limit the output of the amplifier, so that in case of a plurality of frequencies being present simultaneously one frequency cannot override the other frequencies and thus the signal receiver is protected against false operation. A further safeguard against such false operation is provided by the multi-winding relays 2FG to 5FG. Each relay has as many windings as there are rectifier-operated relays (2FI to 5FI), and in case single frequencies only are used for signalling one winding of each multi-winding relay is connected with the break contact of a corresponding rectifier-operated relay, while the other windings are each connected with make contacts of the other rectifier-operated relays. In cases of signalling with, for example, a combination of two frequencies as shown for relays 2FG and 3FG only some of the relay windings are connected as mentioned before. With no signals on the line all multi-winding relays are operated, breaking at their contacts 2FG1, 3FG1, 4FG1, and 5FG1 the circuits for the relays 2FR to 5FR respectively. The latter relays fulfill the same or similar functions as described above in connection with the relays 2FR and 3FR of Fig. 1. When a pure signal frequency is received one of the relays 2FI to 5FI (depending on the tuning of the connected circuit) will operate and release the corresponding multi-winding relay. If, however, other frequencies are present at the same time which may operate additionally one or the other of the relays 3FI to 5FI, then the multi-winding relay will not release, as it is kept energized over one or more of its other windings and the corresponding make contacts of the other rectifier-operated relays. If only the frequencies corresponding to relays 2FI and 3FI are received then the signal composed of these frequencies will be received in the proper manner as both relays 2FG and 3FG will release as there is no winding of relay 2FG operated over contact 3FI1 and no winding of relay 3FG operated over contact 2FI1.

Figure 5:
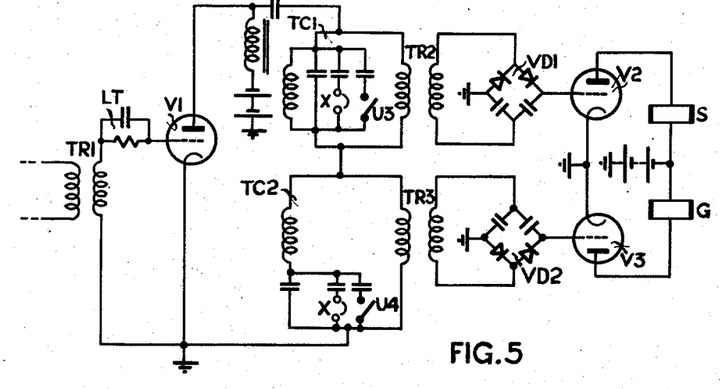
Fig. 5 shows schematically the circuit of a signal receiver which can be used at the outgoing as well as the incoming end of the signalling system.
Figure 6:
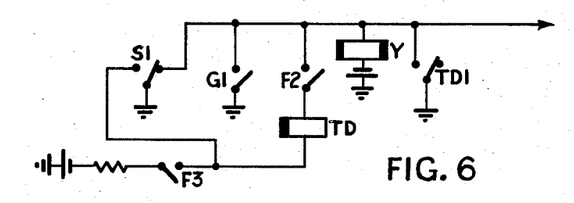
Fig. 6 gives the circuit arrangement for translating signals in the forward direction using the signal receiver shown in Fig. 5.
Figure 7:
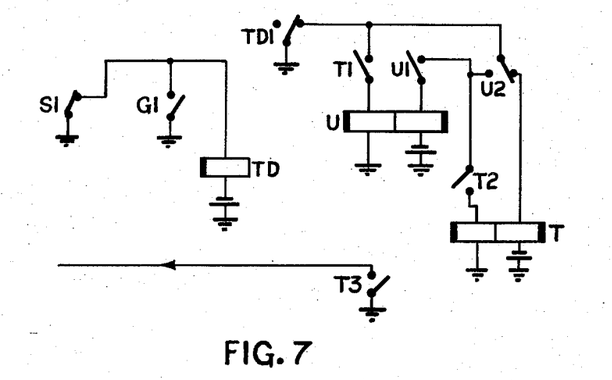
Fig. 7 gives the circuit arrangement for translating signals in the backward direction using the signal receiver shown in Fig. 5.

Another example of a signal receiver which can be used at the outgoing as well as the incoming end is shown in Fig. 5. This receiver, when used at the incoming end operates the relay arrangement shown in Fig. 6, and when used at the outgoing end, it uses the relay arrangement of Fig. 7.

The receiver is connected with the communication channel by a transformer TR1 which forms part of the grid circuit of amplifier V1. The anode circuit of this amplifier includes the tuned circuits TC1 and TC2 tuned to the signal frequencies and the voltages developed across these circuits are transmitted over transformers TR2 and TR3 to the voltage doubler rectifiers VD1 and VD2 in the grid circuits of valves V2 and V3 respectively which in turn operate the relays S and G. The input circuit of valve V1 includes a limiter circuit LT which limits the total energy supplied to the tuned circuits TC1 and TC2. As long as only the signal frequency is received a voltage is developed across the tuned circuit TC1 which operates the relay S, while practically no voltage appears across the tuned circuit TC2. When, however, other frequencies are included, these other frequencies will develop a voltage across the so-called guard circuit TC2 so that the relay G will operate. The limiter circuit LT limits the total amount of energy in the output of valve V1 and thus the presence of other than signal frequencies reduces the effective signal energy in the output circuit so that operation of the signal relay is further prevented when other frequencies besides the signal frequency are present.

As mentioned above the signal receiver of Fig. 5 can be used either as receiver SRB in Fig. 2 or SRA in Fig. 1. In case of receiver SRB the signal frequency (switched on in the idle condition) operates the contact S. When a call is to be made the signal frequency is removed and the relay S releases to put earth on the lead to the exchange at the same time operating relay Y as described above for relay B (Fig. 2).

If during the release period of relay S any other speech frequencies operate the signal receiver, then the relay G (Fig. 5) will be operated which maintains over contact G1 (Fig. 6) the earth on the lead even if relay S would operate as well. A further safeguard is provided against false operation by a time delay introduced after the dialling has been completed and the called subscriber replies by operating relay F (Fig. 2) to send a supervisory signal to the outgoing end. Operation of relay F closes contacts F2 and F3 (Fig. 6) and thus a circuit for the slow release relay TD, which in turn connects earth with the lead to the exchange. Any spurious operation of relays S and G cannot affect relay TD as it is slow-releasing. When the called subscriber gives a clear signal by releasing relay F the relay TD is released again at contacts F2 and F3. If, on the other hand, the calling subscriber hangs up first, relay S will operate again changing over its contact S1 and thus short-circuiting relay TD which then will release after a time delay, releasing also relay Y, so that the arrangement is ready for the next call.

In using the receiver of Fig. 5 for the receiver SRA in Fig. 1 it has to be adapted to translate pulse signals of different frequencies into direct current steady state signals. Strappings X (Fig. 5) permit the change from the frequency $f1$ in the forward direction to the frequency $f2$ in the backward direction used for the supervisory signal, while relay contacts U3 and U4 of relay U (Fig. 7) will change the receiver to frequency $f3$ for the backward-clear signal as will appear later. When a frequency pulse of frequency $f2$ is transmitted in the backward direction as described earlier the relay S (Fig. 5) of the receiver will operate and release at contact S1 (Fig. 7) the slow-release relay TD which is normally operated and also guarded against wrong release by contact G1 of the guard relay G (Fig. 5). When contact TD1 (Fig. 7) releases it closes a circuit over contact U2 for one winding of relay T so that the latter operates closing its contacts T1, T2 and T3. Over contact T3 the supervisory signal is transmitted in the usual manner. Contacts T1 and T2 have no function yet. As soon as relay TD operates again after the transmission of the pulse relay U operates in series with relay T from earth over one winding of relay U, operated contact T1, contact U2, relay T, battery to earth. The contacts U1 and U2 are so arranged that contact U1 closes before contact U2 breaks, and thus a circuit is established from earth over battery, second winding of relay U, operated contact U1, operated contact T2, relay T to earth. At the same time the circuit over the other winding of relay T is broken at contact U2. Operation of relay U closes also its contact U3 and U4 (Fig. 5) to tune the receiver to the frequency $f3$ used for the backward clear signal.

During conversation the relay T (Fig. 7) remains operated thus maintaining the supervisory signal at contact T3. When the backward-clear signal pulse is received relay TD (Fig. 7) is again released temporarily. Contact TD1 short circuits relay T so that the latter releases and passes on the clear signal by a release of contact T3. Contacts T1 and T2 open and relay U remains energised from earth over contact TD1, operated contacts U2 and U1, relay U, battery to earth. At the end of the signal pulse of frequency $f3$ relay TD is operated again over contact S1 and breaks at contact TD1 the circuit for relay U, so that this relay releases and changes the receiver (Fig. 5) back to operation by the supervisory signal frequency $f2$. The whole arrangement is now back to its normal position.

Although the examples given above refer to three different frequencies one of the frequencies used in the backward direction can be the same as the frequency used in the forward direction, and in some cases the same frequency can be used for all signals. The various relay circuits and the receiver circuit are given by way of example only and many modifications can be made without departing from the spirit of the invention as long as the principle of using continuous current conditions for the essential signals and pulse conditions for those which can be lost is maintained.

Figure 9:
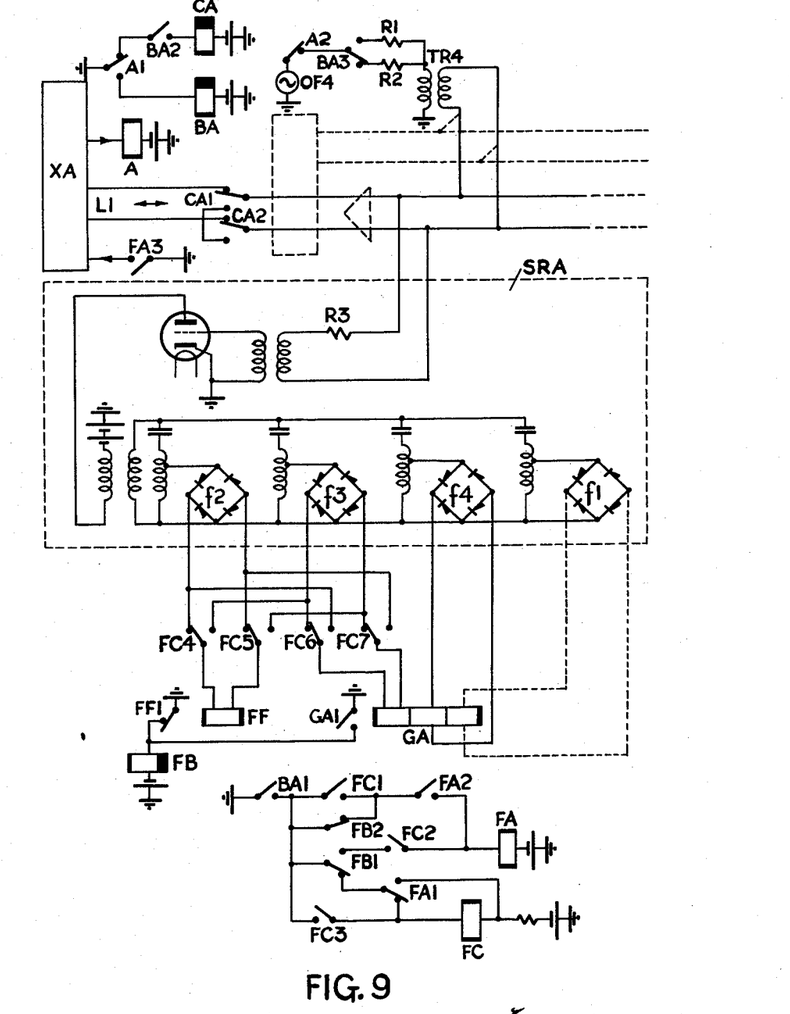
Figs. 9 and 10 show another circuit arrangement for voice frequency signalling according to the invention.
Figure 10:
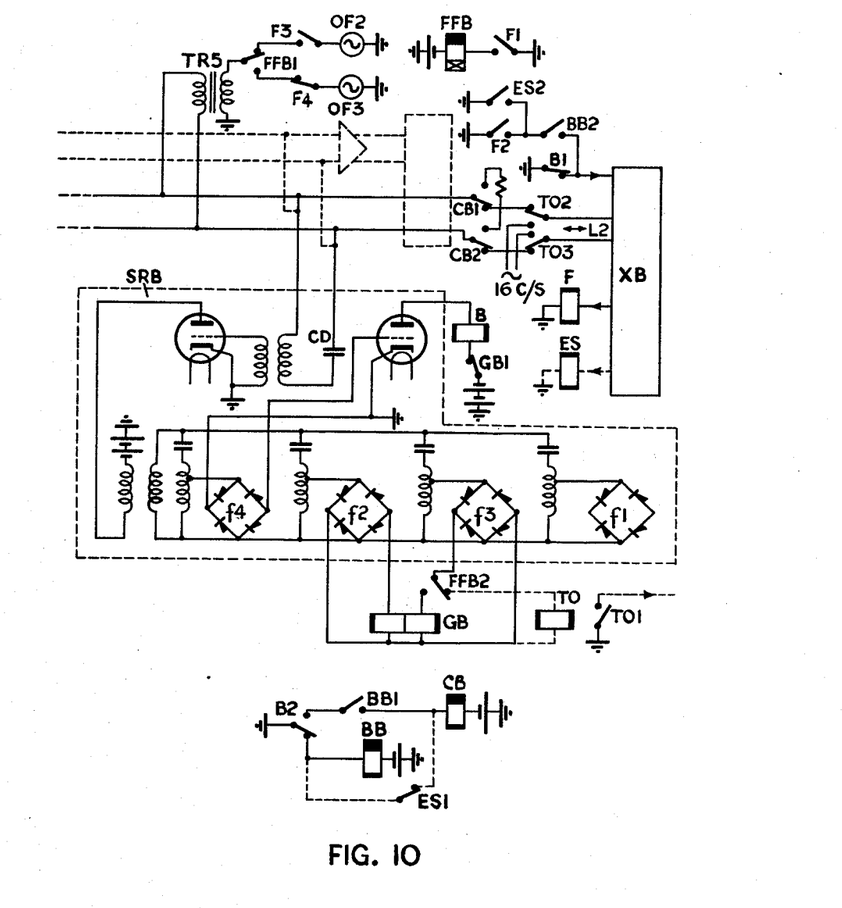

Another embodiment of the invention is shown in Figs. 9 and 10. In this embodiment a higher level of signal current is used for dialling than for the continuous condition. While in idle periods the signal current in the forward direction is transmitted at a level of —20 dbm., dial pulses are sent out at —10 dbm., and the supervisory and backward clear signals are given at an even higher level of 0 dbm., so that a rather insensitive receiver can be used at the outgoing end.

The arrangement in Figs. 9 and 10 shows the outgoing and incoming end of a two-wire connection respectively, but the dotted lines indicate how the system can be changed to a four-wire arrangement with additional amplifiers. In Figs. 9 and 10 four-frequency receivers are shown, but only three frequencies are used for the transmission of the basic line signals, the fourth frequency being available for special signals if required. The receivers are in principle the same as described above in connection with Fig. 3.

All relay contacts are shown in the unoperated position but it can be seen from the circuits that in the idle periods of the system slow-release relay FB (Fig. 9) is operated over contact FFL. Furthermore, as signal current is transmitted continuously during idle periods from the exchange XA to the exchange XB the signal receiver at the latter end is normally operated as will be described in detail later on and thus relay B (Fig. 10) is normally operated operating its contacts B1 and B2.

In the idle periods signal current of a frequency $f4$ is transmitted from a generator OF4 (Fig. 9) over contacts A4 and BA3, resistor R1 and transformer TR4 into the transmission path. This frequency has no effect in the own receiver SRA as it is sent into the line at a level of —20 dbm., and the receiver is rather insensitive owing to the resistor R3 in the input circuit. The signal current reaches over the transmission path the receiver SRB (Fig. 10) which is sensitive enough to operate over the tuned rectifier circuit $f4$ the relay B in the output circuit. This relay operates its contacts B1 and B2 the former removing earth from the signal lead into the exchange XB.

When a call is to be transmitted relay A (Fig. 9) is energized in known manner and interrupts at contact A2 the signal current sent to line. At contact A1 a circuit is closed for slow-release relay BA which operates contacts BA1 to BA3. At contact BA1 a circuit is prepared for later operation of relays FA and FC. Contact BA2 prepares a circuit for relay CA and contact BA3 changes the connection from contact A2 from resistor R1 to resistor R2. At the incoming end (Fig. 10) the release of relay B connects earth at contact B1 to the lead into exchange XB seizing the equipment for the receipt of dial pulses. Contact B2 operates the slow-release relay BB, which prepares a circuit for relay CB at contact BB1 and at contact BB2 prepares a further circuit from earth to the exchange lead to protect the equipment in the exchange against premature release during conversation (when relay F has closed contact F2) by sporadic voice frequencies which might operate the receiver SRB. Dial tone is transmitted back in known manner from exchange XB to exchange XA and the receiver SRB can be protected against this tone by the condenser CD in the input circuit.

When dialling proceeds from exchange XA (Fig. 9) the first interruption of relay A operates the slow-release relay CA over contact A1 and operated contact BA2. This relay changes over its contacts CA1 and CA2 thus terminating the transmission path. Both relays BA and CA have such a release time that they remain operated during dialing. At contact A2 the signal current is again sent over the line from generator OF4 but this time over operated contact BA3 and resistor R2 thus raising the level to —10 dbm. The following dial pulses are thus transmitted into exchange XB. At the first pulse relay B (Fig. 10) operates again and closes at contact B2 a circuit for slow release relay CB over contact BB1. The release times of relays BB and CB are such that they remain operated during pulsing. Relay CB terminates the transmission path at contacts CB1 and CB2. If the automatic exchange XB includes means to send an "end of selection" signal a corresponding relay ES can be operated. This relay opens its contact ES1 to break a circuit provided for relay CB as shown in dotted lines and provides an additional earth over contact ES2 to contacts BB2 and B1. When the called subscriber replies he energizes relay F (Fig. 10). Contact F1 closes a circuit for the slow-operating, slow-releasing relay FFB. Contact F2 connects earth as a safety measure over contact BB2 to contact B1 as mentioned earlier. Contact F3 connects the generator OF2 over contact FFB1 with transformer TR5 and the transmission path to send a signal current of frequency $f2$ back to the outgoing end.

Contact F4 opens and breaks the circuit to generator OF3. After a short time delay relay FFB operates changing over its contact FFB1 and thus interrupting again the signal current f2. In this way a short pulse of frequency f2 has been sent as supervisory signal back over the line. This signal current pulse which is sent at high level (0 dbm.) operates the signal receiver SRA (Fig. 9), and relay FF connected to the rectifier bridge for frequency f2 over contacts FC4 and FC5 operates breaking the circuit of slow-release relay FB at contact FF1 so long as no other frequency is present to operate relay GA with contact GA1 over any of the other rectifiers. The release of relay FB after a short time delay closes at contact FB1 a circuit for relay FC from earth over operated contact BA1, contacts FB1 and FA1, relay FC to battery. Relay FC prepares a locking circuit for itself over contact FC3 and prepares further circuits for relay FA at contacts FC1 and FC2. In addition contacts FC4, FC5, FC6 and FC7 connect relay FF with the rectifiers for frequency f3 while the rectifier for frequency f2 is now connected with the guard relay GA. Thus relay FB operates again over contact FF1 and closes a circuit for relay FA from earth over operated contact BA1, operated contacts FB1 and FC2, relay FA to battery. Relay FA closes a locking circuit for itself over contacts FC1 and FA2 and prepares a release circuit for relay FC at contact FA1. At contact FA3 earth is connected to the lead into exchange XA thus giving the supervisory signal.

In the meantime relay CA has been released as relay A remains operated after the dialling and the line is connected through at contacts CA1 and CA2. Similarly at the called end (Fig. 10) relay B remains de-energized and thus relay CB releases also switching the line through at contacts CB1 and CB2, so that the connection is now ready for conversation between the subscribers.

False operation of the receivers by voice is prevented by the guard relays GA (Fig. 9) and GB (Fig. 10) which operate whenever other frequencies than the particular signal frequency are present and prevent the release of relay FB at contact GA1 (Fig. 9) and the operation of relay B at contact GB1 (Fig. 10) respectively.

If at the end of the conversation the called subscriber hangs up, he de-energizes relay F (Fig. 10) so that relay FFB will release after a certain time delay. In the meantime, however, closing of contact F4 connects the signal generator OF3 with transformer TR5 over operated contact FFB1, and thus a pulse of frequency f3 of a length determined by the release time of relay FFB is transmitted to the outgoing end.

In the signal receiver SRA (Fig. 9) this pulse operates over the rectifiers f3 and operated contacts FC4 and FC5 the relay FF which releases relay FB. Contact FB1 short-circuits relay FC over operated contact FA1 so that relay FC releases. Relay FA, however, remains energized over operated contact BA1, contact FB2 and operated contact FA2.

When the calling subscriber hangs up, relay A releases and after a time delay relay BA releases also opening contact BA1 to release relay FA or in case the calling subscriber did not release, also relay FC. At contact FA3 earth is removed from the lead into exchange XA indicating that the connection has been cleared. At the same time low level signal current of frequency f4 is restored over contacts A2 and BA3, resistor R1 and transformer TR4 to the transmission path to operate again relay B (Fig. 10) at the other end. Operation of relay B breaks the circuit for relay BB at contact B2 and removes earth at contact B1 from the lead into exchange XB as soon as relay BB opens contact BB2. The removal of earth releases the equipment in exchange XB which automatically releases relay F even if the called subscriber has not yet hung up. Thus all the relays have now returned to their proper condition for a new call.

In cases where trunk offering is required this can be done in a simple manner as shown by the relay TO in Fig. 10. A signal of frequency f3 would be sent over the line from exchange XA to operate over the signal receiver SRB (Fig. 10) and the rectifier circuit f3 the relay TO. This relay can either provide earth over contact TO1 for the exchange XB or can send, for example, 16 cycles ringing tone over contacts TO2 and TO3 and line L2 into the exchange. A contact FFB2 of relay FFB in the circuit of relay TO disconnects this relay as soon as the called subscriber has answered and connects the rectifiers f3 with the guard relay GB.

Figure 11:
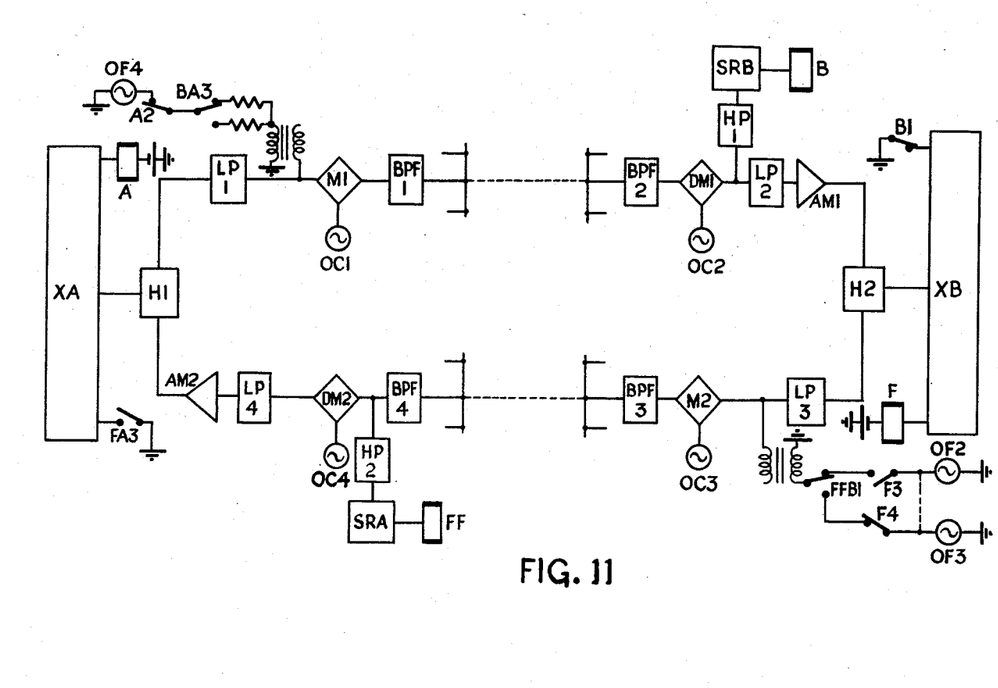
Fig. 11 is a diagram showing the application of the invention to "channel edge" signalling.

While the above examples describe voice frequency signalling systems, Fig. 11 shows the application of the invention to "channel edge" signalling. Fig. 11 gives only diagrammatically the set up of a carrier system using channel edge signalling as the detailed circuits for the continuous plus pulse signalling according to the invention are the same as shown in Figs. 9 and 10. This is indicated in Fig. 11 by the relays A, B, F and FF and the contacts A2, BA3, FA3, B1, FFB1, F3 and F4 which fulfill the same functions as described earlier. Speech frequencies are transmitted, for example, from exchange XA over hybrid H1 and low pass filter LP1 to modulator M1. In the modulator the speech is modulated by a carrier frequency from oscillator OC1 and the wanted modulated sideband is passed on over bandpass filter BPF1 to the common transmission path. At the other side the received sideband reaches over bandpass filter BPF2 the demodulator DM1 in which the demodulation is carried out by a carrier from oscillator OC2, and the demodulated voice frequencies then reach the exchange XB over low pass filter LP2, amplifier AM1 and hybrid H2.

Transmission in the opposite direction is carried out in the same way over the low pass filter LP3, modulator M2 with oscillator OC3, bandpass filters BPF3 and BPF4, demodulator DM2 with oscillator OC4, low pass filter LP4, amplifier AM2 and hybrid H1.

The signalling procedure is the same as described above. In the forward direction a signal current of a frequency at the upper edge of the speech channel is transmitted during idle periods from a signal source OF4 over contacts A2 and BA3 into the line and is modulated in modulator M1 in the same way as speech. At the other end the signal frequency after demodulation in demodulator DM1 reaches over the high-pass filter HP1 the signal receiver SRB thus operating relay B, so that contact B1 is held open in the idle condition. To extend a call from XA to XB relay A is operated in known manner and the signal frequency is removed at contact A2 from the signal path so that relay B releases and connects at contact B1 earth to the lead into exchange XB. Dialling is then carried out as described earlier in connection with Figs. 9 and 10. Similarly the relay F is operated when the called subscriber answers and sends a signal pulse of frequency f2 from generator OF2 back to receiver SRA which translates this pulse over relay FF in the above described manner into a continuous supervisory signal at contact FA3. At the end of the conversation a further signal pulse is sent in the backward direction either of a frequency f3 or as indicated by the dotted line of the same frequency f2, which over signal receiver SRA opens again contact FA3 to give the backward clear signal. As no signal frequency is transmitted in either direction during conversation the low pass filters of the system have just to meet the usual requirements for suppression of carrier leak. A false operation of the signal receiver in the forward direction is prevented by the high pass filter HP1. The voice energy at the top of the speech frequency band is much lower than in the middle of the band, and in many cases a tuned circuit can replace the high pass filter HP1. An additional protection is given by the low pass filter LP1 which further reduces any frequencies in the speech band which would fall in the vicinity of the signal frequency.

In the backward direction of transmission the signal receiver is protected against voice operation additionally by reduced sensitivity, as the signal pulses can be given with an energy of higher level without overloading the system.

Figure 12:
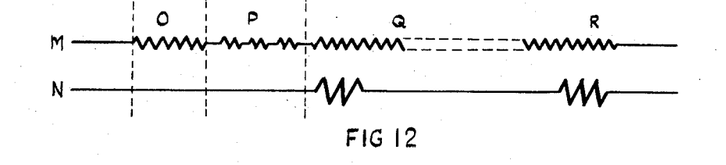
Fig. 12 shows the signalling schedule according to the invention for a carrier telephone system using the carrier itself for signalling.

The invention is also applicable to carrier signalling as mentioned above, and a particular example is hereafter described in connection with Figs. 12 to 14 relating to a single channel carrier telephone system in which the same carrier frequency is used in both directions over a two-wire line by providing the lower sideband for the forward direction of transmission and the upper sideband for the backward direction. In this example the signal schedule is as shown in Fig. 12. No carrier is on the line during idle periods. In the forward direction shown at M a low level carrier is switched on to initiate a call as shown at O. Dialling is then carried out by interrupting the carrier (shown at P) and a continuous low level carrier remains on the line during conversation (Q) and is switched off for the forward clear signal (R). In the backward direction of transmission shown at N no carrier is on the line for any length of time. When the called subscriber answers a short pulse of high level carrier is sent back to the calling end to give a supervisory signal (Q) and a similar pulse is sent (R) to indicate the backward clear signal.

Figure 13:
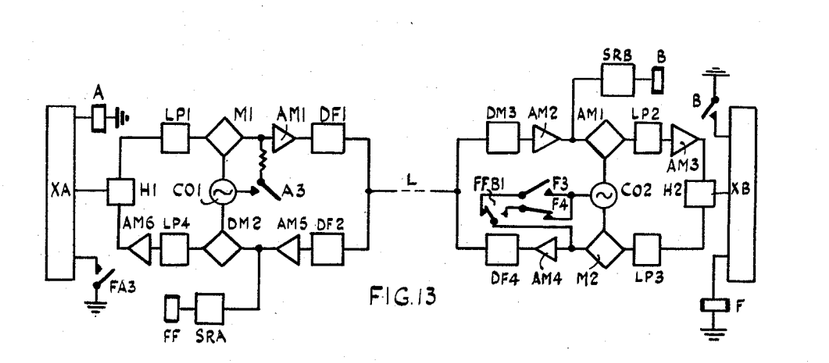
Fig. 13 shows schematically the circuit for such a carrier system.
Figure 14:
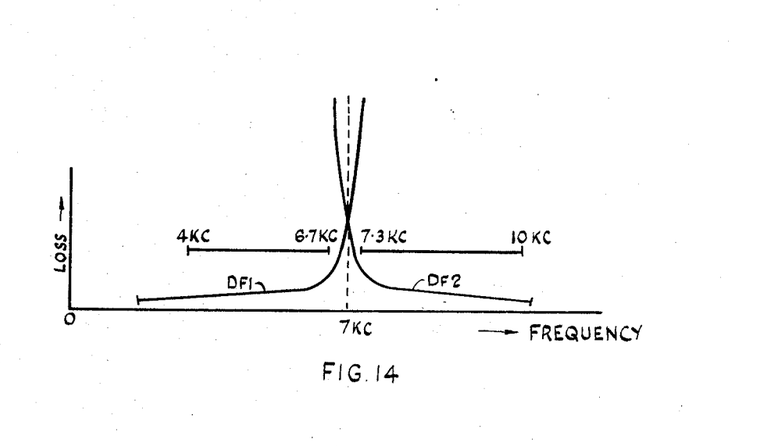
Fig. 14 gives the attenuation of the directional filters separating the two directions of transmission.

The schematic circuit diagram for such a system is shown in Fig. 13. The exchanges XA and XB are connected over the two carrier terminals and a two wire line L. The two directions of transmission are separated by the directional filters DF1, DF2 and DF3, DF4. Characteristic loss curves for such filters are shown in Fig. 14 for a carrier frequency of, for example, 7 kc./sec. The curves show the two sidebands used in the forward and backward direction of transmission respectively. Such systems are known and as they are chiefly used for relatively short lines, it is important to keep the equipment as simple as possible. It is, therefore, quite a substantial advantage to provide the same carrier frequency from the oscillators CO1 and CO2 and to use this frequency also for signalling in both directions. Under normal arrangements the signal sent over the line by closing of contact A3 would not only reach the receiver SRB over amplifier AM1, filter DF1, line L, filter DF3, and amplifier AM2, but will also pass through the directional filter DF2 and amplifier AM5 into the receiver SRA, as the carrier frequency (used for signalling) lies at the cross-over point of the directional filters DF1 and DF2 ae shown in Fig. 14. By using the invention with the schedule of Fig. 12 it can be seen that it is possible to use a very low level carrier in the forward direction with a sensitive receiver SRB, while using high level pulses (for example 20 db higher) in the backward direction to operate the receiver SRA. These pulses can take up the full power available in the amplifiers (AM4, AM5, AM6), as they need be only 50 or 100 milliseconds long and do not pass when conversation is taking place. With this signalling arrangement it is then easy to adjust the receiver SRA so that it will not respond to the low level current sent from oscillator CO1 over contact A3 but will respond only to the high level pulses transmitted from oscillator CO2 over the contact group FFB1, F3 and F4.

High level pulses in the backward direction could reach signal receiver SRB over the directional filters DF4 and DF3. As the receiver is already operated the high level pulses have no further effect on it. In case the called subscriber fails to hang up before the receiver SRB has been released from the calling end, provision can be made to suppress the second high level pulse in the backward direction. This can be achieved in an easy manner, for example, by a contact of relay B interrupting the signal pulse circuit. The arrangement can be used also in connection with "Ringdown," e.g. when changeover to dialling is wanted later. In this case the "ring" pulse in the backward direction can disable the receiver for the forward direction to avoid false operation. This again can be done by a simple relay contact arrangement disabling the receiver depending on one of the pulse sending relays.

Operation of the signalling relays in the case of carrier signalling (Fig. 13) is the same as described in connection with Figs. 9 and 10. The only difference is that relay A operates contact A3 to switch the carrier on for a call signal and that, therefore, contact B3 of relay B is now a make-contact to pass the calling signal into exchange XB.

The hybrids H1, H2, the modulators M1, M2, the demodulators DM1 and DM2, and the other filters and amplifiers are of a structure normally used in this kind of system and need no further description.

A variety of transmission systems has been described above to illustrate the application of the invention. The invention is, however, not limited to these systems and can be applied to other transmission systems with the same advantages as mentioned above.

I claim:

1. In a telephone system having a first terminal, a second terminal and a transmission path including a forward and a backward signalling path between said terminals, first telephone circuits coming into said first terminal and further telephone circuits going out from said second terminal, and switching means at said first terminal and said second terminal operable over said signalling paths to establish selected connections between said first telephone circuits and said further telephone circuits, a signal receiver at each said terminal, a source of alternating signal current of predetermined frequency and signal means at said first terminal to transmit signals over said forward signalling path to said signal receiver at said second terminal by the transition from one level of transmitted alternating signal current to another and to maintain said last mentioned level until a further signal is to be transmitted; a further source of alternating signal current of predetermined frequency and further signal means at said second terminal to transmit pulses of said lastmentioned alternating signal current of predetermined length and level over said backward signalling path to said signal receiver at said first terminal after a selected connection has been established and terminated respectively.

2. In a telephone system having a first terminal, a second terminal and a transmission path between said terminals, first telephone circuits coming into said first terminal and further telephone circuits going out from said second terminal and switching means at said first terminal and said second terminal to establish selected connections between said telephone circuits, a signal receiver at each said terminal, a source of alternating current of predetermined frequency and signal means at said first terminal to transmit a call signal for the establishing of a connection from a calling party at one of said first telephone circuits to a called party at one of said further telephone circuits to said signal receiver at said second terminal by the transition from one level of alternating signal current to another and to maintain said lastmentioned level, and to transmit a forward clear signal to said receiver at said second terminal by a transition from said lastmentioned level of carrier current back to said firstmentioned level; a further source of alternating signal current of predetermined frequency and further signal means at said second terminal to transmit a supervisory signal after a selected connection to said called party has been established by a short pulse of said lastmentioned alternating signal current and to transmit a backward clear signal at the termination of said connection by said called party by a further short pulse of said last mentioned alternating signal current.

3. In a telephone system having a first terminal, a second terminal and a transmission path including a forward and a backward signalling path between said terminals, a signal receiver at each said terminal, a source of alternating signal current of predetermined frequency and signal means at said first terminal to transmit signals over said forward signalling path to said signal receiver at said second terminal by the transition from one level of transmitted alternating signal current to another and to maintain said last mentioned level until a further signal is to be transmitted; a further source of alternating signal current of predetermined frequency and further signal means at said second terminal to transmit pulses of said last mentioned signal current of predetermined length over said backward signalling path to said signal receiver at said first terminal at a level higher than the highest level of said signal current in the forward signalling path, said signal receiver at said first terminal having a lower sensitivity than said receiver at said second terminal and responding only to signal pulse current of said higher level.

4. In a telephone system having a first terminal, a second terminal and a transmission path including a forward and a backward signalling path between said terminals, first telephone circuits coming into first terminal and further telephone circuits going out from said second terminal, and switching means at said terminals to establish selected connections between said telephone circuits, a signal receiver at each said terminal, a source of alternating signal current and signal means at said first terminal to transmit said alternating current at a predetermined level as a call signal over said forward signalling path to said signal receiver at said second terminal, said level being maintained during any said connection to keep said signal receiver operated and being reduced to zero for the transmission of a forward clearing signal; further sources of alternating signal currents and further signal means at said second terminal to transmit pulses of said lastmentioned alternating currents of predetermined length, frequency and level as a supervisory signal and a backward clearing signal over said backward signalling path to said signal receiver at said first terminal after a selected connection has been established and has been terminated respectively, the level of said pulses being higher than the level of said signal current from said firstmentioned source, said signal receiver at said first terminal having a lower sensitivity than said receiver at said second terminal and responding only to signal pulse current of said higher level.

5. In a telephone system having a first terminal, a second terminal and a transmission path including a forward and a backward signalling path between said terminals, first telephone circuits coming into said first terminal and further telephone circuits going out from said second terminal, and switching means at said terminals to establish selected connections between said telephone circuits, a signal receiver at each said terminal, a source of alternating signal current of predetermined frequency and signal means at said first terminal to transmit said alternating current at a predetermined level over said forward signalling path to said signal receiver at said second terminal during the idle periods and to interrupt said alternating current to give a call signal by releasing said receiver at said second terminal, said alternating signal current remaining interrupted during any said connection, and to switch on said alternating current for the transmission of a forward clear signal; further sources of alternating signal currents and further signal means at said second terminal to transmit pulses of said lastmentioned alternating currents of predetermined length, frequency and level as a supervisory signal and a backward clear signal over said backward signalling path to said signal receiver at said first terminal after a selected connection has been established and has been terminated respectively, the level of said pulses being higher than the level of said alternating signal current from said firstmentioned source; and means in each of said receivers to guard said receivers against operation by other frequencies than those of said firstmentioned and said further sources of alternating signal current respectively.

6. In a telephone system as claimed in claim 4 having a first terminal, a second terminal and a transmission path connecting said terminals, a source of alternating signal current at said first terminal, further sources of alternating signal currents at said second terminal, the frequencies of said alternating signal currents from said first source and said further sources having frequencies within the range of frequencies used for speech transmission over said transmission path.

7. In a telephone system having a first terminal, a second terminal and a transmission path including a forward and a backward signalling path between said terminals, a signal receiver at each said terminal, at said first terminal a source of alternating current of predetermined frequency, signal means to transmit signals over said forward signalling path to said signal receiver at said second terminal by the transition from one continuous level of transmitted alternating signal current to another and to maintain said lastmentioned level until a further signal is to be transmitted, and switching means to periodically change the level of said signal current for the transmission of dial pulses and to raise the level of said dial pulses above the highest continuous level of said signal current; further sources of alternating signal currents and further signal means at said second terminal to transmit pulses of said lastmentioned alternating signal currents of predetermined length and frequency over said backward signalling path to said signal receiver at said first terminal at a level higher than the level of said dial pulses transmitted over said forward signalling path, said signal receiver at said first terminal having such a sensitivity as to respond only to the signal current pulses in said backward signalling path.

8. In a telephone system having a first carrier terminal, a second carrier terminal and a carrier transmission path accommodating speech channels, each said channel having a forward and a backward signalling path between said terminals, first telephone circuits coming into said first carrier terminal and further telephone circuits going out from said second carrier terminal, and switching means at said terminals to establish selected connections between said telephone circuits, a signal receiver and a source of alternating signal current for each said speech channel at each said terminal, said signal currents having frequencies at the upper edge of the frequency band transmitted by each said speech channels, low pass filters in each speech channel for the suppression of carrier leak having insufficient attenuation to suppress interference between said signal currents and said speech band, signal means at said first terminal for each said speech channel to transmit signal current from said source at said first terminal continuously at a predetermined level over said forward signalling path to said corresponding receiver at said second terminal during the idle periods and to interrupt said signal current to give a call signal by releasing said receiver at said second terminal, said signal current remaining interrupted during any said connection over said corresponding speech channel, and to switch on said signal current for the transmission of a forward clear signal; further signal means at said second terminal for each said speech channel to transmit pulses of signal current of predetermined length and level as a supervisory signal and a backward clear signal from said source at said second terminal over said backward signalling path to said corresponding signal receiver at said first terminal after a selected connection has been established and has been terminated respectively, to leave said speech channel free from signal frequencies in the forward and backward direction during speech transmission over said connection.

9. In a telephone system having a first carrier terminal, a second carrier terminal and a carrier transmission path accommodating speech channels, each speech channel having a forward and a backward signalling path between said terminals, first telephone circuits coming into said first carrier terminal and further telephone circuits going out from said second carrier terminal, and switching means at said terminals to establish selected connections between said telephone circuits, a signal receiver and a source of carrier current for each said speech channel at each said terminal; signal means at said first terminal for each said speech channel to transmit signals over said corresponding forward signalling path to said corresponding receiver at said second terminal by the transition from one level of transmitted unmodulated carrier current to another and to maintain said lastmentioned level until a further signal is to be transmitted; further signal means at said second terminal for each said speech channel to transmit pulses of unmodulated carrier current of predetermined length and level over said corresponding backward signalling path to said corresponding signal receiver at said first terminal after a selected connection has been established and terminated respectively.

10. In a telephone system having a first carrier terminal, a second carrier terminal and a carrier transmission path accommodating speech channels, each speech channel having a forward and a backward signalling path between said terminals, first telephone circuits coming into said first carrier terminal and further telephone circuits going out from said second carrier terminal, and switching means at said terminals to establish selected connections between said telephone circuits, a signal receiver and a source of carrier current for each said speech channel at each said terminal; signal means at said first terminal for each said speech channel to transmit unmodulated carrier current at a predetermined level as a call signal over a corresponding forward signalling path to said corresponding receiver at said second terminal, said level being maintained during any said connection to keep said signal receiver operated and being reduced to zero for the transmission of a forward clearing signal; further signal means at said second terminal for each said speech channel to transmit pulses of unmodulated carrier current of predetermined length as a supervisory signal and a backward clearing signal over said backward signalling path to said corresponding signal receiver at said first terminal after a selected connection has been established and has been terminated respectively, the level of said pulses being higher than the level of said carrier current transmitted over said forward signalling path.

11. In a telephone system as claimed in claim 9 having a first carrier terminal, a second carrier terminal and a carrier transmission path accommodating speech channels, a source of carrier current for each said speech channel at each said terminal, the carrier currents for the transmission of signals and the modulation and demodulation of speech having the same frequency in both directions of transmission.

No references cited.